United States Patent Office 3,411,877
Patented Nov. 19, 1968

3,411,877
PROCESS FOR PRODUCING WATER
DISPERSIBLE HYDRARGILLITE
Max Michel, Sarcelles-les-Rosiers, and Denis Papée,
Paris, France, assignors to Pechiney-Saint-Gobain,
Neuilly-sur-Seine, France
No Drawing. Filed May 8, 1964, Ser. No. 366,153
Claims priority, application France, May 14, 1963,
934,790
3 Claims. (Cl. 23—143)

ABSTRACT OF THE DISCLOSURE

A water dispersible hydrargillite produced by precipitation of aluminum hydroxide in solution with a monovalent acid in an amount to maintain the pH within the range of 8 to 9 to form an alumina gel, copiously filtering and washing the gel to produce an alumina gel in which the ratio of monovalent acid ions to alumina is at least 0.1, maintaining the alumina gel at a temperature below 60° C. without desiccation until the mass is converted to the hydrargillite structure.

This invention relates to the production of a crystalline aluminum hydroxide having a hydrargillite type structure and it relates more particularly to a crystalline aluminum hydroxide of the type described which is relatively free of such cations as sodium.

Hydrargillite is the most common variety of aluminum hydroxide and is employed on a large scale in the production of aluminum by insemination of aqueous solutions of sodium aluminate. The product obtained in the foregoing process is characterized by a large proportion of sodium which is difficult to eliminate. In addition, the hydrargillite crystals that are produced are of such configuration and size as to render them less fit for use where purity and uniformity are factors.

It is an object of this invention to produce an aluminum hydroxide of the hydrargillite type characterized by very finely divided particles which are easily dispersible in water and it is a related object to provide new and improved uses of the aluminum hydroxide produced in accordance with the practice of this invention.

The process of this invention results in a mass of aluminum hydroxide having a hydrargillite structure characterized by well defined crystals and which is relatively free of metallic impurities such as sodium. In accordance with the practice of this invention, a cake of alumina gel, produced by filtering and washing an aluminum hydroxide suspension having a quantity of monovalent acid ions equal to at least a ratio of 0.1 based upon the aluminum content calculated as $Al_2O_3$ molecules, is maintained at a temperature within the range of ambient temperature to 60° C. without desiccation until the cake is transformed into a mass of hydrargillite structure. This may call for holding the cake for an extended period of time up to several days under the temperature conditions described without desiccation of the cake.

The mass is then submitted to a very gradual desiccation at as low a temperature as possible and preferably at a temperature which does not exceed 110° C. A solid product is obtained which shows a hydrargillite structure under X-ray diffraction examination. The product is brittle and easily dispersible in water by simple agitation or mixing to give a stable colloidal solution.

The product has a specific area or specific surface in excess of 80 m.²/g. which indicates its great dimensional character. Under an electron microscope, it appears to have a regular foliated structure in which very fine crystal flakes may appear, characteristic of a nucleus for crystal formation, all of which spells the difference between the crystalline mass obtained by this invention and the alumina of the hydrargillite variety obtained by the classical processes heretofore empolyed in the formation of aluminum hydrate for the fabrication of aluminum.

It is essential, in the practice of this invention, to provide for a very gradual drying of the mass of hydrargillite structure, preferably at low temperature and under partial vacuum. Heating to too high a temperature to effect desiccation has the effect of increasing the cohesion between the formed hydrargillite particles whereby dispersion in aqueous medium becomes more difficult. When the hydrargillite is to be immediately suspended in aqueous medium, it is possible to eliminate the drying step and proceed directly to the suspension of the hydrargillite into the aqueous system by suitable agitation.

In accordance with the practice of this invention, the cake of treated alumina gel contains 10 to 20 percent by weight of alumina calculated as $Al_2O_3$. It may be obtained by precipitation of a solution of a soluble aluminum compound by an acid or base followed by copious washing and filtering with water. It is formed preferably by a process of continuous precipitation with vigorous agitation using a solution of sodium aluminate and the addition of acids for precipitation in an amount and at a rate to maintain the pH within the range of 8 to 9.

The quantity of acid that remains fixed to the hyroxide and which is necessary for producing the crystallized mass of hydrargillite structure, in accordance with the practice of this invention, will depend somewhat on the pH during precipitation. The closer the pH to neutrality, the greater the importance of the quantity of fixed acid. The rate of evolution of the alumina gel cake to the crystallized mass of the hydrargillite structure depends upon the amount of fixed acid. The higher the amount of fixed acid, the slower the evolution rate. Although it is possible to make use of a ratio of monovalent acid ions to alumina, calculated as $Al_2O_3$, equal to or greater than 0.5, for commercial practice it is preferred to make use of a ratio of about 0.2 so that the time required for evolution will not be too long.

The rate of evolution of the alumina gel cake is also influenced by the temperature. The higher the temperature, the faster the rate of evolution. However, if the temperature is allowed to exceed 60° C., other crystal forms of aluminum hydroxide will be obtained. In commercial practice, it is preferred to carry out the evolution step at ambient temperature, usually lower.

By reason of the particular structure of the hydrargillite obtained by the practice of this invention, it is possible to produce thin continuous films of alumina. By reason of the large specific area, the product of the invention also finds excellent use as an absorption agent. It can also be used for making easily dispersible fine pigments. It can also be employed as a precursor to all of the alumina forms obtained by dehydration of hydrated alumina and primarily activated alumina obtained by calcination at low temperature.

The following examples are given by way of illustration, but not by way of limitation, of the practice of this invention.

Example 1

An alumina gel suspension, titrating 50 g./l. of alumina, calculated as $Al_2O_3$, is obtained in a tank by continuous addition of nitric acid with vigorous agitation to a solution of sodium aluminate containing 100 g./l. of alumina, calculated as $Al_2O_3$, and in which the ratio of $Na_2O/Al_2O_3$ is 1.5. The nitric acid is added in such concentration and amounts as to maintain the pH between 8 to 8.5 throughout the time of precipitation. The suspension is homogenized by agitation for about one hour and is then processed in a centrifugal dryer, filtered and washed, with at least 50 liters of water per kg. of alumina.

The cake, which contains 15% $Al_2O_3$, 2% $NO_3^-$ ions is allowed to stand in an impervious plastic bag for five days at 40° C. The ratio of $NO_3/Al_2O_3$ is 0.21. The product is then dried under partial vacuum at a temperature of 40° C.

A brittle mass is obtained which is easily dispersible in water. Under examination with an electron microscope, the product appears to have a very fine foliated structure and the specific area, measured by absorption, is 92 $m.^2/g$. X-ray analysis indicates the presence of hydrargillite.

Example 2

The same process as in Example 1 is carried out but without desiccation of the washed alumina gel cake. When the evolution is completed, the hydrargillite mass is directly converted into a suspension at room temperature by mixing with twice its weight of water. A stable colloidal suspension is obtained which gives no sign of settling.

A sheet of glass with a perfectly clean surface is immersed in the suspension and treated to leave a small quantity of liquid as a layer on the surface. The layer is left to dry very slowly whereupon a continuous transparent film of alumina is obtained which exhibits some sticky characteristics. When the film is of sufficient thickness, its cohesion is sufficient to allow the removal of portions of the film for physical examination.

Example 3

As in Example 1, an alumina gel is precipitated but with the addition of nitric acid to maintain the pH between 8.5 to 9. The washing and filtering of the gel cake is carried out as before to produce a cake containing 17 percent by weight alumina, calculated as $Al_2O_3$, 1.6 percent by weight $NO_3^-$ ions and 25 parts per million sodium ions corresponding to a ratio of $NO_3/Al_2O_3$ of 0.15. The cake is aged in an impervious plastic bag for twenty days at room temperature. A crystallized mass is secured, which, under X-ray examination, establishes a hydrargillite structure. Examination under an electron microscope shows a fine flaky structure. The specific area, measured by nitrogen absorption, is 140 $m.^2/g$. and the product is characterized by an easily divisional state.

It will be apparent from the foregoing that we have provided a new and improved process for the production of an improved aluminum hydroxide having a hydrargillite structure and which product finds many new and improved uses.

It will be understood that changes may be made in the details of formulation and processing without departing from the spirit of the invention, especially as defined in the following claims.

We claim:
1. A process for the preparation of a finely divided, easily dispersible crystalline aluminum hydroxide having only the hydrargillite structure, having a specific surface area in excess of 80 $m.^2/g$. and which is relatively free of metallic impurities comprising forming an alumina gel cake in which the amount of alumina is within the range of 10 to 20 percent by weight, calculated as $Al_2O_3$ by precipitating aluminum hydroxide from a solution containing aluminum ions with a monovalent acid in an amount to maintain the pH within the range of 8 to 9, filtering and water washing the precipitate, maintaining the resulting alumina gel cake in which the ratio of monovalent acid ions to alumina is at least 0.1 without desiccation at a temperature below 60° C. until the mass is converted to a hydrargillite structure, and submitting the formed mass of hydrargillite to gradual desiccation at a temperature less than 110° C.

2. The process as claimed in claim 1 in which the ratio of monovalent acid ions to alumina is greater than 0.1 but less than 0.5.

3. The process as claimed in claim 1 in which the precipitation of the aluminum hydroxide is carried out by a continuous process with the addition of acid and continuous agitation.

References Cited

UNITED STATES PATENTS

| | | | |
|---|---|---|---|
| 2,247,624 | 7/1941 | Wall | 23—143 |
| 2,973,245 | 2/1961 | Teter et al. | 23—143 |
| 3,086,845 | 4/1963 | Malley et al. | 23—143 |
| 3,124,418 | 3/1964 | Malley et al. | 23—143 |

OTHER REFERENCES

Russell: "Alumina Properties," Technical Paper No. 10, Aluminum Co. of America, Pittsburgh, Pa. 1953, pages 25 and 26.

EARL C. THOMAS, *Primary Examiner.*

HERBERT T. CARTER, *Assistant Examiner.*